United States Patent [19]
Meehan et al.

[11] Patent Number: 6,061,390
[45] Date of Patent: *May 9, 2000

[54] P-CODE ENHANCED METHOD FOR PROCESSING ENCRYPTED GPS SIGNALS WITHOUT KNOWLEDGE OF THE ENCRYPTION CODE

[75] Inventors: Thomas K. Meehan, Glendale; Jess Brooks Thomas, Jr.; Lawrence E. Young, both of La Canada, all of Calif.

[73] Assignee: California Institute of Technology, Pasadena, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/299,946

[22] Filed: Sep. 2, 1994

[51] Int. Cl.[7] .............................. H04B 15/00; H04K 1/00; H04K 1/02; H04L 27/30; G01S 5/02

[52] U.S. Cl. .................... 375/208; 342/357.12; 380/255; 701/213

[58] Field of Search ...................... 380/37, 255; 342/189, 342/194, 352, 357, 357.12; 701/213; 375/206, 208–210

[56] References Cited

U.S. PATENT DOCUMENTS

| | | |
|---|---|---|
| 4,463,357 | 7/1984 | MacDoran . |
| 4,797,677 | 1/1989 | MacDoran et al. . |
| 4,807,256 | 2/1989 | Holmes et al. ............................ 375/97 |
| 4,972,431 | 11/1990 | Keegan . |
| 5,101,416 | 3/1992 | Fenton et al. ................................ 375/1 |
| 5,134,407 | 7/1992 | Lorenz et al. . |
| 5,293,170 | 3/1994 | Lorenz et al. . |
| 5,347,536 | 9/1994 | Meehan ....................................... 375/1 |
| 5,369,411 | 11/1994 | Lisle, Jr. ................................... 342/194 |
| 5,390,207 | 2/1995 | Fenton et al. ............................... 375/1 |
| 5,535,278 | 7/1996 | Cahn et al. ............................... 380/49 |

*Primary Examiner*—Pinchus M. Laufer
*Assistant Examiner*—Hrayr A. Sayadian
*Attorney, Agent, or Firm*—Leonard Tachner

[57] ABSTRACT

In the preferred embodiment, an encrypted GPS signal is down-converted from RF to baseband to generate two quadrature components for each RF signal (L1 and L2). Separately and independently for each RF signal and each quadrature component, the four down-converted signals are counter-rotated with a respective model phase, correlated with a respective model P code, and then successively summed and dumped over presum intervals substantially coincident with chips of the respective encryption code. Without knowledge of the encryption-code signs, the effect of encryption-code sign flips is then substantially reduced by selected combinations of the resulting presums between associated quadrature components for each RF signal, separately and independently for the L1 and L2 signals. The resulting combined presums are then summed and dumped over longer intervals and further processed to extract amplitude, phase and delay for each RF signal. Precision of the resulting phase and delay values is approximately four times better than that obtained from straight cross-correlation of L1 and L2. This improved method provides the following options: separate and independent tracking of the L1-Y and L2-Y channels; separate and independent measurement of amplitude, phase and delay L1-Y channel; and removal of the half-cycle ambiguity in L1-Y and L2-Y carrier phase.

23 Claims, 7 Drawing Sheets

P-CODE ENHANCED METHOD FOR PROCESSING ENCRYPTED GPS SIGNALS WITHOUT KNOWLEDGE OF THE ENCRYPTION CODE

ORIGIN OF INVENTION

The invention described herein was made in the performance of work under a NASA contract, and is subject to the provisions of Public Law 96-517 (35 USC 202) in which the Contractor has elected to retain title.

TECHNICAL FIELD

The present invention relates generally to receivers for the Global Positioning System (GPS) and more specifically to, an improved method and apparatus for recovering the GPS L1-P and L2-P carrier phases and pseudoranges despite encryption of the P-code signal and without knowledge of the encryption code.

BACKGROUND ART

For over a decade, the U.S. Department of Defense has been assembling the Global Positioning System (GPS), a constellation of 24 earth-orbiting satellites with altitudes of approximately 20,000 km and periods of about 12 hours. Each satellite transmits coded signals toward earth for reception by specially designed receivers. Given a complete constellation, the satellite orbits are constructed so that a receiver positioned anywhere on earth will be able to see at least four satellites. The initial motivation for the Global Positioning System was to provide military users with the capability of determining their positions and velocities and synchronizing their clocks. Since its inception, however, applications of GPS have become steadily broader in commercial and scientific fields, demanding accuracies in position and time far in excess of the original military requirements. Applications of GPS now involve high-accuracy measurements for geodesy, earth dynamics, ionosphere and troposphere investigations, clock synchronization, and orbit determination. The ever more stringent accuracy requirements of these applications have steadily increased the performance standards for GPS receivers.

To allow for ionosphere measurement and calibration, the GPS signal is transmitted at two RF frequencies, L1 at 1575.42 MHz and L2 at 1227.6 MHz. The L1 signal is a sum of two signals, the first comprised of a Gold code called the C/A (coarse/acquisition) code possessing a chip rate of 1.023 MHz and modulated on an L1 carrier and the second comprised of a pseudorandom code called the P (precise) code possessing a chip rate of 10.23 MHz and modulated on an L1 carrier in phase quadrature with the C/A carrier. The chip sequence of the slower C/A code repeats every millisecond and is used for acquiring the signal, particularly when the position and/or timekeeping of the receiver are relatively uncertain. For the faster P code, the chip sequence repeats every 7 days and is typically difficult to acquire without aiding from the C/A channel. The L2 signal consists of a carrier at 1227.6 MHz modulated by a P code that is currently identical to the P code on L1. For both the C/A and P codes, each satellite generates a unique code sequence, thereby allowing separation of signals. All three of these signals are further modulated by a common 50 Hz "telemetry" code, referred to as the data bits or navigation message. When interpreted, the data bits supply information about the health of the satellites, orbit parameters for each satellite, a clock offset for each satellite and other information.

Standard processing of GPS signals consists of correlating a received signal with a model signal constructed as a model carrier modulated by a model code. A number of techniques (e.g., maximizing correlation amplitude or minimizing tracking error) can be used to adjust the delay of the model code so that it is substantially aligned with the received code and to adjust the phase of the model carrier so that it is substantially locked to the received phase. Delay measured in this manner is a measure of the transit time (range) from the satellite to the receiver and is a sum of geometric, tropospheric, ionospheric and clock effects. It is sometimes referred to as pseudorange to denote the presence of the receiver clock error. In this disclosure, delay will also be referred to as group delay. Because of its higher chip rate, the P-code signal leads to more accurate measurements of group delay than the C/A-code signal. Phase extracted in such processing provides a measure of the same quantities as group delay but at much higher precision. However, phase usually only reveals time variations since it is afflicted with an unknown bias in the form of a phase ambiguity. In some applications, special processing can remove the phase ambiguity, thereby making phase a much more powerful observable. Delay values derived from phase will be referred to as phase delay.

At the discretion of the military, the P code can be encrypted by modulating the P code with another code, sometimes referred to as the A-code in the civilian sector. A discussion of the nature of the A code has been presented in U.S. Pat. No. 5,134,407 to Lorenz et al (1992) and will not be repeated here. From the civilian point of view, imposition of encryption has the effect of preventing unauthorized users from using the P-code signals in the standard fashion of correlating with a local model of the P code. Since phase and delay measurements derived from P-code signals are so valuable, various techniques have been devised, attaining various levels of performance, to process P-code signals without knowledge of the encryption code.

In this disclosure, the term "encryption-mode" will denote any mode of processing an encrypted P code signal without knowledge of the encryption code. The term "code mode" will denote a mode of processing an unencrypted P-code signal that correlates a replica of the known P code with the received signal and thereby despreads the signal spectrum. Since encryption does not affect the C/A channel, that channel is usually processed in a "code mode" with the known C/A code.

In some applications, signal fading due to multipath or scintillations is a problem, with fading occurring at different times for L1 and L2. If measurement of L1 and L2 amplitudes is a goal of the application, such as scintillation or atmospheric occultation measurements, the receiver should be capable of measuring L2 amplitude independently of L1 amplitude so that amplitude information is not compromised on the good channel when the other fades. Along related lines, if the application requires fast reacquisition of a faded channel, signal tracking for a given channel should be made independent of the other channel so that the good channel can maintain lock across the fading interval and then aid the weak channel to reacquire. Furthermore, if L2-P can be tracked independently of L1-P, the receiver can consist of only two channels, L1-C/A and L2-P. In applications for which it is feasible, such a two-channel receiver would lower cost and power consumption.

One trait common to all encryption-mode methods to date is lower SNR relative to code-mode operation, particularly at low elevations and/or at low antenna gain. When the P code is not encrypted, code-mode operation is greatly superior under those low signal conditions and therefore a very desirable option. Since it is not unlikely that the military will change its policy again and allow long intervals of unencrypted operation, it is therefore important to have a method that can function in either the code mode or the encryption mode so that code-mode operation can be selected when the P code is not encrypted. In such a dual-mode receiver, maximum commonality of hardware and software between modes would reduce cost and size. Thus, such commonality of operations between modes is an important consideration in judging encryption-mode methods.

As discussed below, some encryption-mode methods suffer from half-cycle ambiguities in L2-P phase. Such half-cycle ambiguities complicate processing to remove phase ambiguities and should be avoided.

Military policy changes have already unexpectedly taken place regarding planned times for encrypting the P code. Since GPS is primarily a military project, the goals and applications of the military will always take precedence over civilian applications, often in unanticipated and disruptive ways. Thus, it is important to make successful operation of receivers as immune as possible to policy changes by the military. One convention that potentially could be changed is the total commonality of the encryption code between L1 and L2. In principle, either the encryption-code signs or the encryption-code transition times could be made disparate between L1 and L2. Such a change would incapacitate some encryption-mode methods. Thus, a very desirable attribute of an encryption-mode method would be relative immunity to changes in the nature of the encryption code.

In summary, there is a need for a method that can operate in either the code mode (i.e., using P code when there is no encryption) or the encryption mode (when there is encryption) and satisfy all of the following criteria in either mode: exhibit strong SNR for P tracking; measure both delay and phase independently for all channels; avoid half-cycle ambiguities in L2-P carrier phase; have maximum commonality of hardware and software in the code mode and encryption mode; provide the optional capability of separately and independently tracking the L1 and L2 channels; make independent measurements of L1-P amplitude and L2-P amplitude; provide the option of operating with only the L1-C/A channel and L2-P channel eliminating the need for an L1-P channel; and not rely on the assumption the encryption code is the same for L1 and L2.

The following patents disclose methods for operating in the encryption mode, with the indicated advantages and disadvantages. In U.S. Pat. No. 4,797,677 to MacDoran and Spitzmesser (1989), an encryption-mode method, called delay-and-multiply, is proposed that, for either L1 or L2, delays the signal by 50 ns and multiplies it times the undelayed signal. The resulting product contains a periodic signal representing the P-code "clock" at 10.23 MHz plus a doppler effect. In another channel, the signal is squared, producing another periodic signal representing the carrier at twice the carrier frequency. The phase of each of these tones can be extracted to obtain measurements of carrier phase and P-code delay. The positive aspects of this method are: L2-P can be processed without L1-P processing, L1-P and L2-P amplitudes can be independently measured, and the method does not require the encryption code to be the same for L1 and L2. Unfavorable aspects are the following. Because of self-multiplication, this method suffers from greatly reduced SNR and from half-cycle ambiguities in carrier phase. Further, if a parallel code-mode system is implemented along with this method, there would be considerable disparity in code-mode and encryption-mode hardware and software. Thus, this invention falls short of the important criteria listed above.

In U.S. Pat. No. 4,463,357 to MacDoran (1984), an encryption-mode method is proposed that carries out at about a 20 MHz rate a straight cross-correlation of the L1 and L2 signals, thereby relying on the commonality of P code encryption between L1 and L2. In the MacDoran invention, the resulting correlation products lead to measurements of the differences in group delay between L1 and L2, which are used to extract the columnar electron content of the ionosphere between the satellite and the receiver. Although the MacDoran invention has the sole purpose of ionospheric measurement via differences in group delay and the MacDoran claims and disclosure do not foresee broader uses for the disclosed cross-correlation method, such a method can be extended to measure the difference in L1-P phase and L2-P phase, in addition to the difference in L1-P group delay and L2-P group delay. Given these observable differences, the broader method can use measurements of L1 phase and delay generated by the L1-C/A channel to extract phase and delay for L2-P. L2-P phase would have full-cycle ambiguities. L1-C/A phase and delay would serve as the L1 channel observables. No separate processing for L1-P is performed. The disadvantages of the extended cross-correlation method are as follows. Similar to squaring, the multiplication of L1 and L2 channels in cross-correlation causes a large loss of SNR relative to code-mode operation, leaving the cross-correlation SNR at far less than optimal levels at low elevation angles. Since L1-C/A phase and delay are used to recover L2-P phase and delay from the differences, the L2-P observables can be afflicted with errors from the L1-C/A channel. With regard to the commonality of operations between code mode and encryption mode, if a code-mode system were implemented along with cross-correlation, hardware could be nearly common but software would be disparate in many ways. This method assumes encryption is the same for L1 and L2, which currently is the case, but could be changed by the military. Amplitude for L2-P is not separately extracted but appears in a product of L1 and L2 amplitudes. Thus, this invention also falls short of the important criteria listed above.

In U.S. Pat. No. 4,972,431 to Keegan (1990), an encryption-mode method is proposed that improves upon the squaring method by reducing the signal-to-noise loss. In this method, a local model of the P code is correlated with the received encrypted L1 and/or L2 signals containing the product of the P code and the encryption code. The correlation removes the P code, leaving a pseudo-random sequence of A-code signs, each of duration of approximately 2 $\mu$s. Since the A-code bandwidth is about 20 times smaller than the P code bandwidth, a 500-kHz filter can be used to improve SNR prior to squaring, leading to an SNR increase of about 13 dB. The advantages of this prior art method are: it can measure both phase and delay, separately measure L1-P and L2-P amplitudes, and process L2-P without L1-P. Its disadvantages are that it suffers from the aforementioned problem of half-cycle ambiguities as a result of the squaring operation and requires considerably different processing in the code mode and encryption mode, both in hardware and software. Thus, this invention also falls short of the important criteria listed above.

In U.S. Pat. No. 5,293,170 to Lorenz et al (1994), an encryption-mode method is disclosed that not only enhances the SNR of encryption-mode operation using a strategy similar to that of Keegan (see above), but also eliminates half-cycle ambiguities in carrier phase. In its first steps, the Lorenz method separately correlates the L1 signal and the L2 signal with a respective model of the P code and counter-rotates with a respective model carrier. The resulting correlation products are then summed and dumped over successive A chips to increase SNR. For both the L1 and L2 signals, the sign of prompt in-phase sum is then extracted as an estimate of the A-code sign. To reduce the effect of the sign flips of the A code, the A-code sign from L1 is multiplied times all correlation products from L2 and, in mirror image fashion, the A-code sign from L2 is multiplied times all correlation products from L1. Subsequent processing carries out the usual functions of tracking delay and phase, generating feedback, and measuring phase and delay. In this method, SNR is increased by about 13 dB relative to squaring and the half-cycle ambiguities in phase are eliminated through a stepwise process based ultimately on L1-C/A phase. The advantages of this method are: the SNR relative to straight squaring is substantially increased, half-cycle ambiguities are eliminated, both delay and phase are measured for L1-P and L2-P, and commonality of hardware and software between code mode and encryption mode is nearly total, except for the indicated A-code-sign operations between L1 and L2. However, the Lorenz invention, which comes closest to the criteria set forth above, does not meet all of the criteria and has the following important disadvantages relative to the present invention:

1. In the Lorenz invention, P-channel processing does not produce separate measurements of L1 and L2 amplitudes but provides measurement of products of the two amplitudes. L-band-specific amplitude measurements are important in some applications, such as investigations of ionospheric scintillation and atmospheric occultation for which wide variations in amplitude occur. In the Lorenz invention, if the amplitude for L1 moves to a value too small to measure, for example, the amplitude of L2 can not be measured. If the L1 amplitude decreases to a small value, the error in the deduced L2 amplitude will be large. In contrast, the present invention can make separate and independent measurements of either the L1 or L2 amplitude, regardless of the value of the other amplitude.

2. Related to the preceding disadvantage is the undesirable feature of the Lorenz invention that lock on the L2-P signal is lost if the lock on L1-P is lost, which means signal contact can not be maintained. Thus, even if amplitude measurement is not a goal, interdependence of channels is a detriment. In contrast, with the present invention, it is possible to construct a receiver in which lock can be maintained independently on L1 and L2 and either channel can maintain contact with the signal if the other is lost. Such a capability is important in applications where L-band-specific signal fading, such as that due to scintillations or multipath, is a problem and where fast reacquisition of the faded channel is important.

3. When L1-P and L2-P phases and delays are measured as described in the Lorenz invention and in the present invention, the resulting precision in dual-band-calibrated output, typically the output of most importance in high-accuracy surveying, geodesy and orbit determination, is better by approximately 20% in phase delay and 30% in group delay for the present invention than for the Lorenz invention, given the nominal GPS power ratio for L1 and L2.

4. The Lorenz invention can not be operated without the L1-P channel. In contrast, in applications that allow a half-cycle ambiguity in L2 phase, the present invention can be implemented with only two channels (L1-C/A, L2-P) rather than three (L1-C/A, L1-P, L2-P) and still provide valuable dual-band performance. This 33% reduction in the number of channels would offer the advantages of lower power, lower gate count, and lower cost.

5. The Lorenz invention is based on the assumption that the A-code signs for L1-P and L2-P are the same, which means the Lorenz invention would not function if the military changed this current convention. In contrast, since mathematics dictates that the A-code will always be the same on the two quadrature components of a given RF channel, the present invention is immune to such changes and would still operate at full capability if this convention were changed.

6. The Lorenz invention assumes the transition times of the L1-P A-code are substantially coincident with those of the L2-P A-code. If the military changed this convention, the Lorenz invention would be compromised. In contrast, following the argument of the preceding paragraph, the present invention is immune to such transition-time changes. By similar argument, the present invention does not have to contend with possible time dealignment of the L1-P and L2-P signals incurred in route to the receiver, such as that caused by the ionosphere.

This review of known patents on encryption-mode processing shows none of the reviewed methods satisfies all of the important criteria summarized above. As shown below, the current invention does meet all of these criteria.

SUMMARY OF THE INVENTION

An improved P-code-enhanced method processes encrypted GPS signals without knowledge of the encryption code and provides several advantages relative to other approaches. Unlike the preferred embodiments of other encryption-mode receivers, the present invention offers all of the following advantages in one receiver: strong SNRs for L1-P and L2-P, excellent precision in L1-P and L2-P phase and delay, optional capability of separate and independent tracking of the L1-P and L2-P channels to eliminate fading cross-over, separate and independent measurement of L1-P amplitude and L2-P amplitude, the option of dual-band measurements without a separate L1-P channel, removal of the half-cycle ambiguity in L2-P phase, and the option of operation in either the code mode or the encryption mode with maximum commonality of hardware and software between modes. With regard to the threat of possible changes by the military to the nature of the encryption code, the method would still work if the encryption code for L1 is not the same as the encryption code for L2, unlike some other encryption-mode approaches.

Using the known C/A code, the L1-C/A channel is processed to track L1-C/A delay and phase, provide data-bit synch to the DSP, provide fast feedback in the form of L1-C/A carrier phase to the P channels, and generate measured values for L1-C/A amplitude, phase and delay.

With regard to the P channels, each RF channel (either L1 or L2) is processed independently of the other RF channel as follows. Each RF channel is down-converted in quadrature and sampled. Each of the two quadrature components (called "cosine" and "sine") for a given RF channel is separately subjected to a three-lag (early, prompt, late) correlation with a model P code, counter-rotated with a model phase, and summed and dumped over intervals substantially coincident with A chips. For each lag in each quadrature component, when the receiver is in lock, this processing produces an in-phase (I) sum possessing nearly all the power and a quadrature (Q) sum that is a measure of the tracking error in phase. In all, there are 12 sums for each RF channel, namely, 3I sums and 3Q sums for each quadrature component, where 3 refers to the early, prompt, and late lags. The effect of the A code is reduced in the 12 correlation sums for a given RF channel by cross-processing with the prompt I sums from that channel. For the prompt-I sums, the prompt I sum from the sine component is multiplied times the prompt-I sum from the cosine component. For the other sums, however, an additional 3 dB improvement in noise is ultimately gained by first adding the two prompt I sums from the two quadrature components and then multiplying the result times all six Q sums and times the four early and late I sums. Said 3-dB improvement is gained in both tracking and estimation of phase and delay. After these multiplications, all 12 correlation sums are summed and dumped over 20-ms intervals coincident with data bits. For each RF channel, the complex correlation sums corresponding to the same lag are then added to produce 6 correlation sums, i.e., one complex correlation sum for each of the three lags.

Subsequent processing follows the steps used when the P code is unencrypted, in which the correlation sums are processed to track code delay and phase of the signal, generate feedback for code correlation and phase counter-rotation, and generate measured values for amplitude, delay, and phase. When necessary, the half-cycle ambiguity in L2-P carrier phase can be determined through use of a simple cross-correlation of the L1 and L2 channels or, as an option, by multiplying said combined prompt I sum from L1 times the corresponding combined prompt I sum from L2 and summing such products over about a second.

Because of the sums over A-chips with duration of about 2 $\mu$s, as well as the 3 dB improvement gained by combining I sums between quadrature components, the effective SNR for phase and delay obtained from this cross-processing method is approximately 13 dB greater for the L2-P channel than the corresponding SNR obtained from straight cross-correlation of L1 and L2. Relative to the invention described in Lorenz, the present invention improves the system-noise error in measured dual-band-calibrated phase delay by about 20% and in measured dual-band-calibrated group delay by 30%, given the GPS specification for the power ratio of L1 and L2. Dual-band-calibrated output is typically the most important observable-type in high-accuracy applications, such as geodesy, surveying, relative positioning and orbit determination.

Another advantage of the present invention relative to some other encryption-mode approaches is commonality of hardware and software between code-mode operation and encryption-mode operation. More specifically, when the P code is not encrypted, only the aforementioned cross-processing needs to be turned off.

OBJECTS OF THE INVENTION

It is therefore a principal object of the present invention to provide an improved method and apparatus for separately and independently measuring L1-P amplitude and L2-P amplitude in an encrypted GPS signal without knowledge of the encryption code.

It is another object of the present invention to provide an improved method and apparatus with the optional capability of tracking the L1-P signal and L2-P signal in an encrypted GPS signal, separately and independently of one another, without knowledge of the encryption code.

It is another object of the present invention to provide an improved method and apparatus for tracking the L1-P and L2-P signals in an encrypted GPS signal without knowledge of the encryption code but with much better SNR than that obtained by straight cross-correlation of L1 and L2 or straight signal squaring.

It is another object of the present invention to provide an improved method and apparatus for tracking the L1-P and L2-P signals in an encrypted GPS signal without knowledge of the encryption code but with better precision in dual-band-calibrated phase and delay than that obtained by other encryption-mode methods.

It is another object of the present invention to provide an improved method and apparatus for tracking the L1-C/A and L2-P signals in an encrypted GPS signal without knowledge of the encryption code, without tracking the L1-P signal.

It is another object of the present invention to provide an improved method and apparatus for tracking the L1-P and L2-P signals in an encrypted GPS signal without knowledge of the encryption code and without the requirement that the encryption codes for L1-P and L2-P be the same.

It is another object of the present invention to provide an improved method and apparatus for separately and independently measuring the L1-P phase and delay and the L2-P phase and delay in an encrypted GPS signal without knowledge of the encryption code.

It is another object of the present invention to provide an improved method and apparatus for measuring with full-cycle ambiguities L1-P phase and L2-P phase in an encrypted GPS signal without knowledge of the encryption code.

It is another object of the present invention to provide an improved method and apparatus for tracking a P-code signal in a GPS signal with the option of operating in either the code mode or the encryption mode without knowledge of the encryption code, with maximum commonality of hardware and software between modes.

BRIEF DESCRIPTION OF THE DRAWINGS

The aforementioned objects and advantages of the present invention, as well as additional objects and advantages thereof will be more fully understood hereinafter as a result of a detailed description of preferred embodiments when taken in conjunction with the following drawings in which.

DETAILED DESCRIPTION OF A PREFERRED EMBODIMENT

Figure 1:
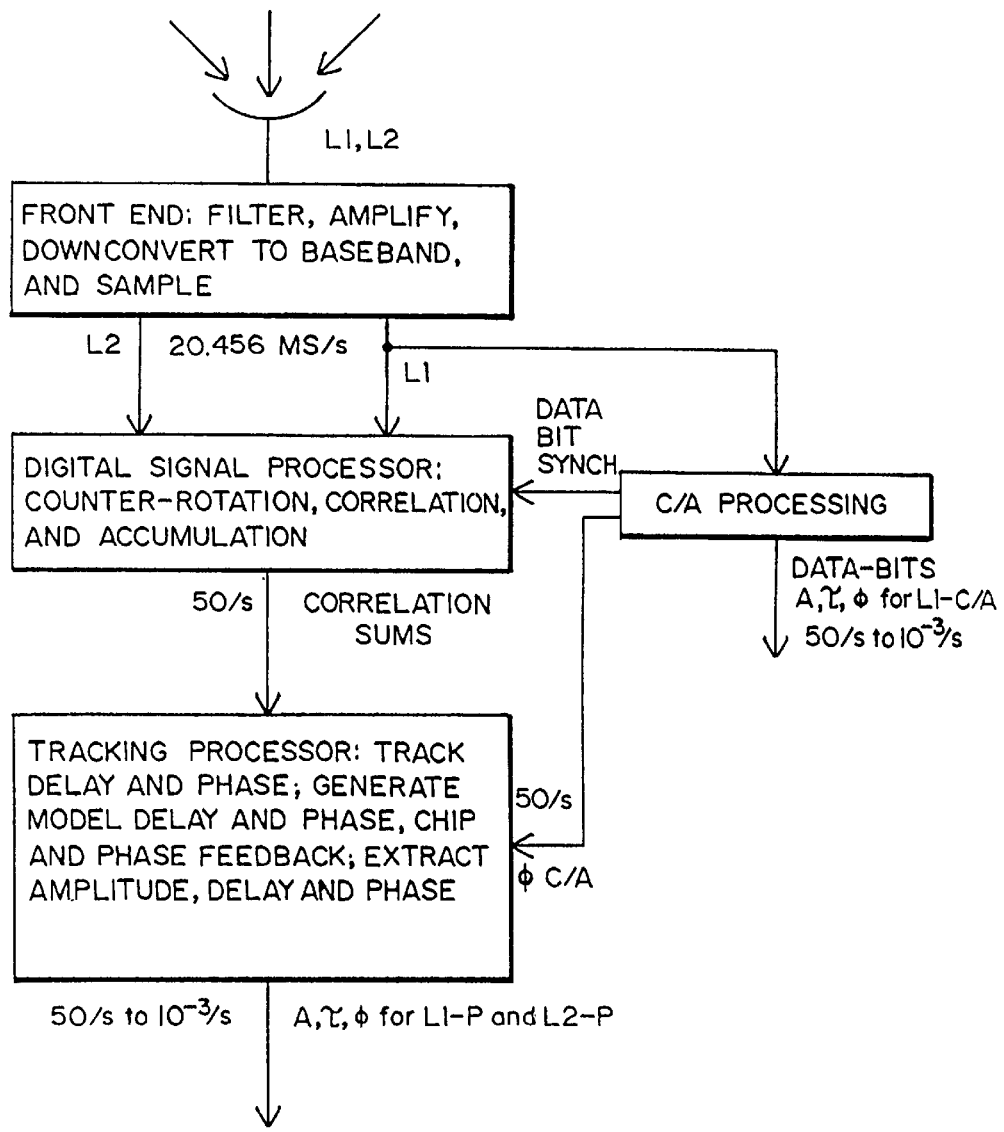
FIG. 1 is a top-level block diagram of the preferred embodiment of the receiver of the invention including antenna, front end, digital signal processor, tracking processor, and C/A channel processor.
Figure 8:
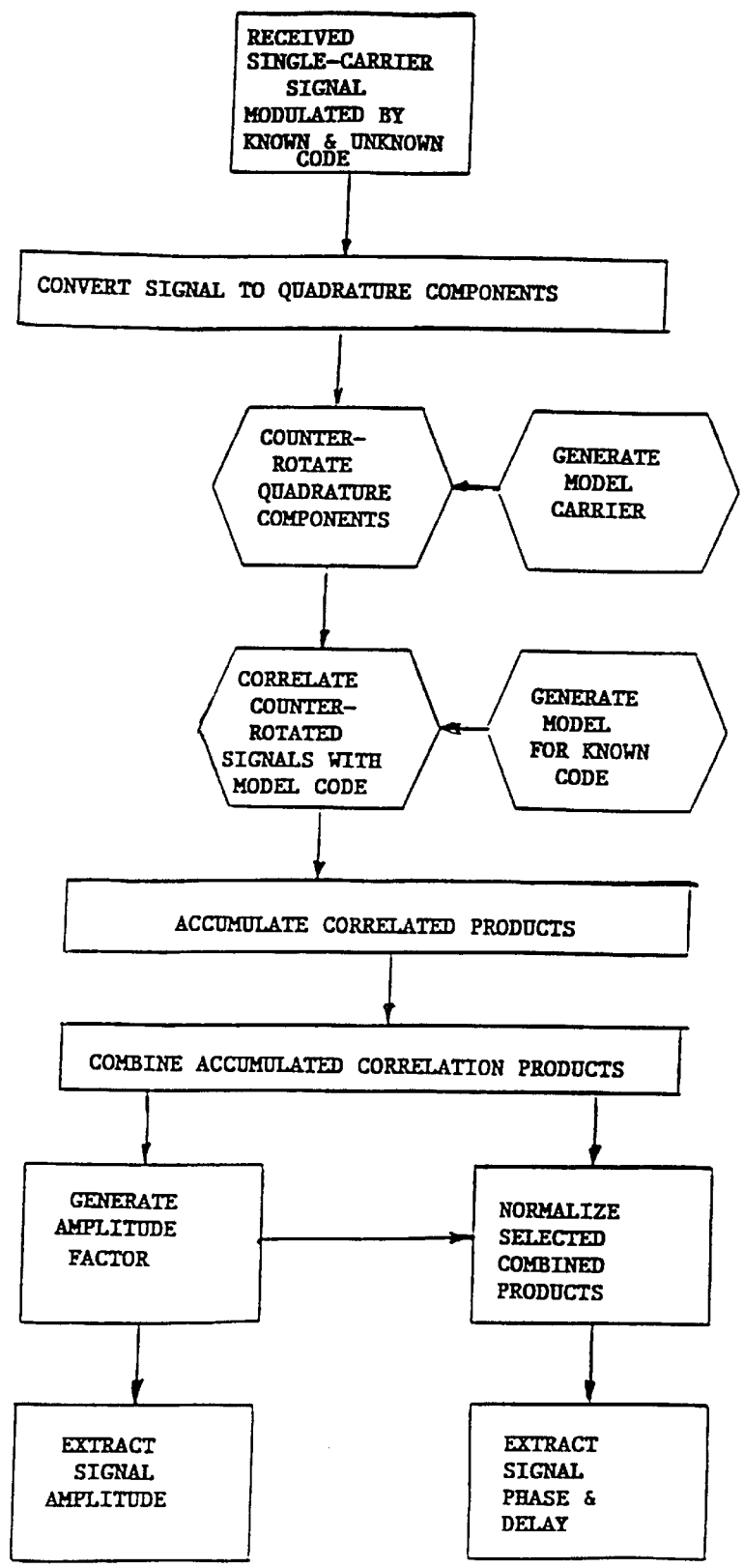
FIG. 8 illustrates a block diagram of signal processing in the receiver of the present invention.

A high-level block diagram of the receiver is presented in FIG. 1 and a block diagram of the signal processing of the receiver is presented in FIG. 8. The signal picked up by the antenna is passed to the front end where it is amplified, filtered, separated into L1 and L2 bands, down-converted to baseband, and sampled. A digital signal processor (DSP) performs higher-speed operations such as phase counter-rotation, correlation with model P code and accumulation. A tracking processor (TP) performs slower operations required to track the signal in delay and phase, generate phase and chip feedback, and extract measured amplitude, phase, and delay. Processing for the L1-C/A channel, which has been assigned a separate path in FIG. 1, has been described in U.S. Pat. No. 4,821,294 to Thomas (1989) and will not be repeated here. Note, however that the L1-C/A channel supplies real-time information to the P channels in the form of data-bit synch and tracked L1-C/A phase.

Figure 2:
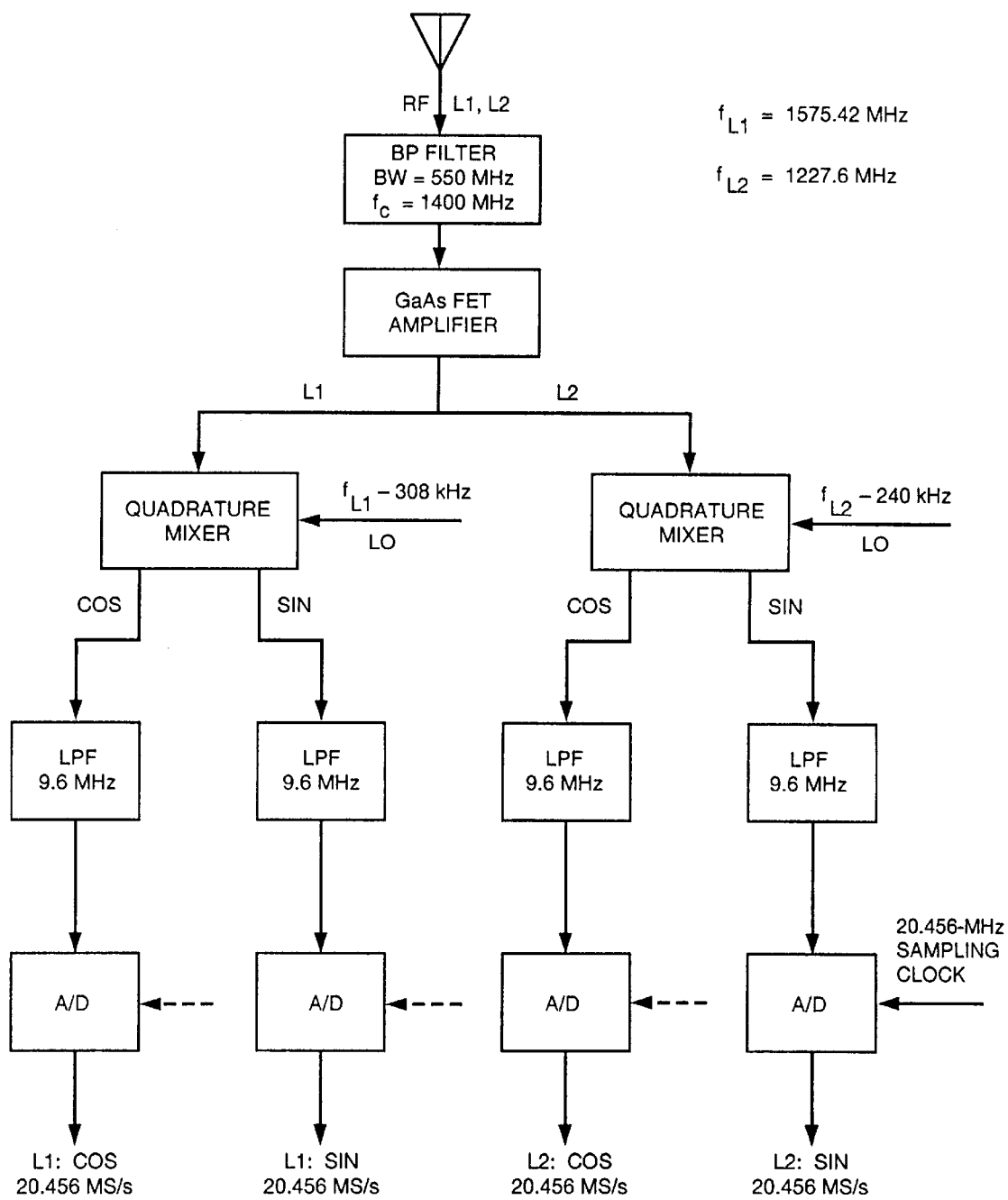
FIG. 2 is a block diagram of the major operations in the front end of the preferred embodiment, including amplification, filtering, separation of the RF (L1 and L2) channels, down-conversion to baseband in quadrature for each RF channel, and A/D conversion.

As shown in FIG. 2 summarizing the front end, the output of the antenna is passed through a bandpass filter to eliminate out-of-band interference. After amplification, the signal is divided into two branches representing the L1 and L2 RF channels, and each branch is down-converted to baseband in the "double-sideband" mode with fixed frequency LOs. The L0 frequencies are 1575.112 MHz for L1 and 1227.36 MHZ for L2. In this processing, each branch is down-converted with a quadrature mixer in order to generate two quadrature ("sine" and "cosine") baseband signals for each RF channel. Each of the four resulting baseband signals is passed through a respective low-pass filter implemented as a seven-pole Butterworth filter with a 3 dB bandwidth of 9.6 MHz. The four filtered signals are then each subjected to an analog-to-digital conversion at a sample rate of $20.456 \times 10^6$ samples/sec (20.456 MS/s).

Figure 3:
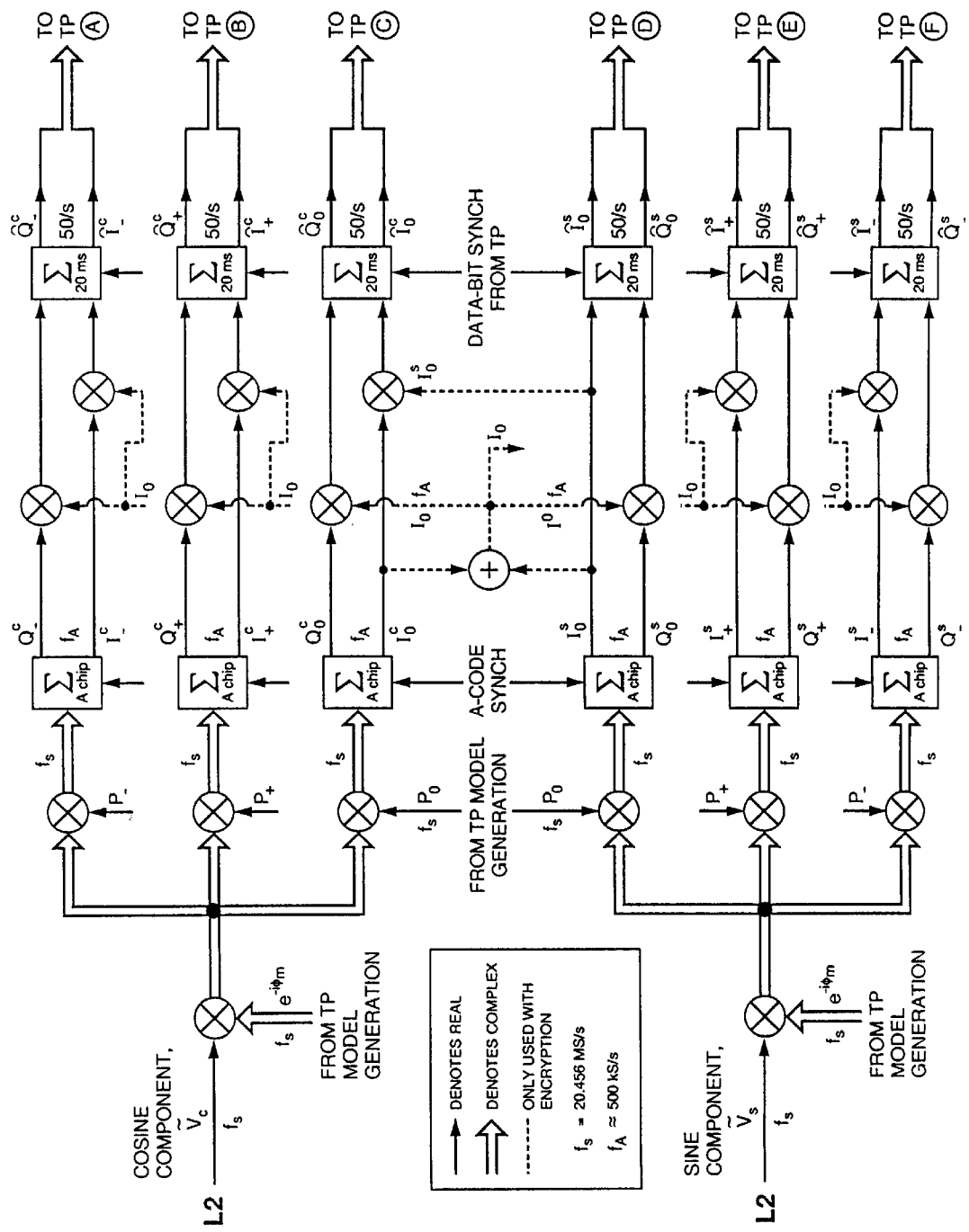
FIG. 3 is a detailed diagram of the preferred embodiment of the P-channel operations in the digital signal processor for the L2 channel, including phase counter-rotation, code correlation, cross-processing, and accumulation.
Figure 4:
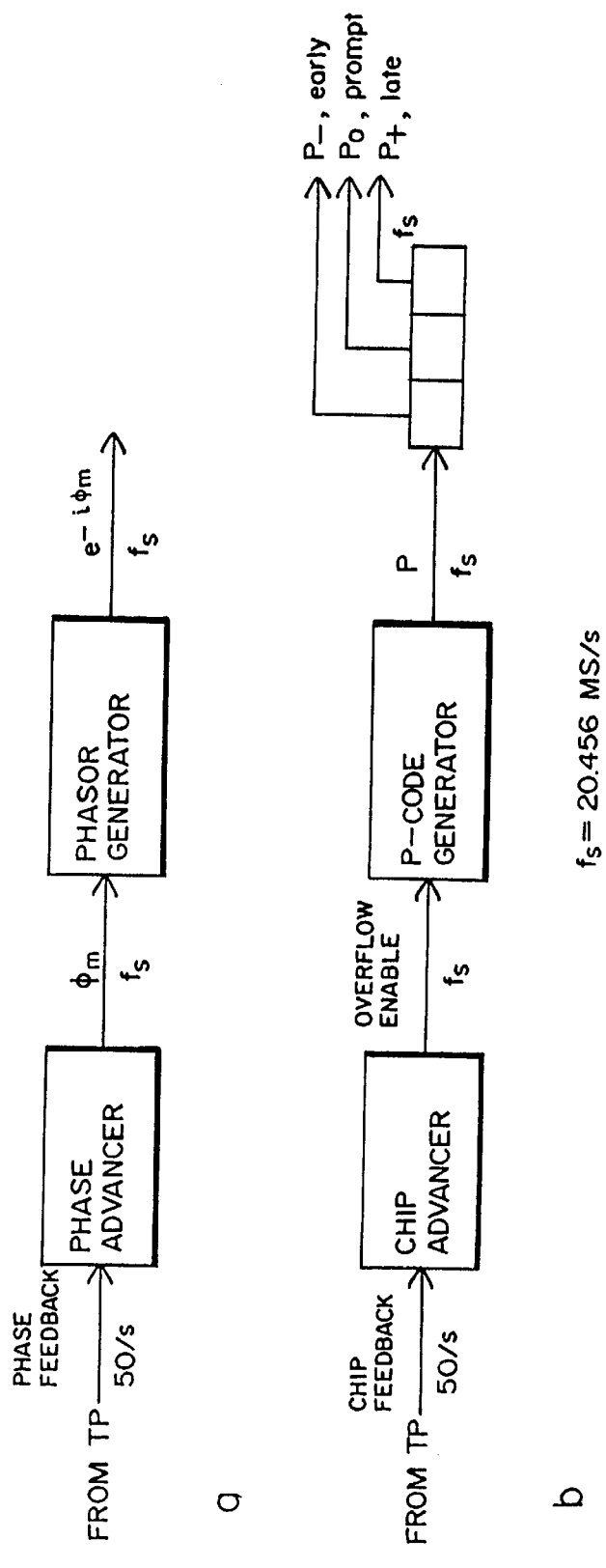
FIG. 4 illustrates the operations in the preferred embodiment of digital signal processor that accept feedback from the tracking processor and generate model counter-rotation phasors and model P code.

After sampling, the L1 and L2 channels follow separate and independent processing paths. However, the steps in each path are identical for L1 and L2. Only processing for the L2 channel will be described with the understanding that identical processing is carried out for L1. As indicated in FIG. 3 for the L2 channel, the two sampled quadrature components are processed by the DSP in two mirror image channels that will be referred to as the "cosine" channel and the "sine" channel. First, each quadrature component is separately counter-rotated with model phasors generated, as indicated in FIG. 4, at 20.456 MS/s on the basis of phase feedback supplied by the tracking processor. Even though each quadrature component in itself is a real quantity, the counter-rotation with a complex phasor produces two products, real and imaginary, for each of the two quadrature components. The real product is referred to as the "in-phase" (I) product and the imaginary product as the "quadrature" (Q) product. When the receiver is in lock, the phase counter-rotation places substantially all the signal in the I product and a small error signal in the Q product.

Each complex product (i.e., I and Q for the cosine channel and I and Q for the sine channel) of the resulting counter-rotated signal is then separately subjected to a three-lag (early, prompt, late) correlation with a model P-code sequence that has been generated by the DSP for the L2 channel, as indicated in FIG. 4, on the basis of feedback supplied by the tracking processor. The resulting complex correlation products, three for the cosine channel and three for the sine channel, are each successively summed and dumped over intervals approximately 2 $\mu$s in length with start/stop times substantially aligned with the edges of the A chips. These correlation sums are produced at a rate of approximately 500,000 sums per sec. Overall for the L2 channel, the operations produce 12 correlation sums, 3I and 3Q for the cosine channel and 3I and 3Q for the sine channel, where the factor of three in each case represents three lags.

In the next step, to mitigate the effect of the A code, cross-processing between quadrature components is carried out. The I sum for the prompt lag in the sine channel is transported up in the figure and multiplied times the prompt-I sum for the cosine channel as indicated in FIG. 3. In parallel, to further reduce noise in subsequent phase and delay extraction, the prompt I sum from the cosine channel and the prompt I sum from the sine channel are added and the result is multiplied times all six of the Q sums found in the sine channel and the cosine channel and times the four side-lag sums (i.e., early and late for sine and for cosine). This combination of the two prompt I sums is not used to cross process the prompt-I sums because of the strong positive correlation of the noise on the combination of prompt-I sums with the noise on either prompt-I sum. This correlation would introduce a bias in the output prompt-I correlation sums that would overwhelm the signal in typical low-SNR cases and unnecessarily complicate amplitude measurement. As analyzed below, a similar correlation causes a large bias in the cross-processed early and late I sums but this noise bias disappears in the difference between early and late sums, thereby leaving the late-minus-early difference as an unbiased measure of delay tracking error. With regard to the Q sums, I noise and Q noise are uncorrelated which leaves the cross-processed Q sums as unbiased measures of phase-tracking error. For the 10 indicated sums, using the prompt-I sum combination reduces the tracking-error noise by 3 dB, which leads to a 3-dB improvement in tracking and estimation for both delay and phase, as shown below.

Figure 5:
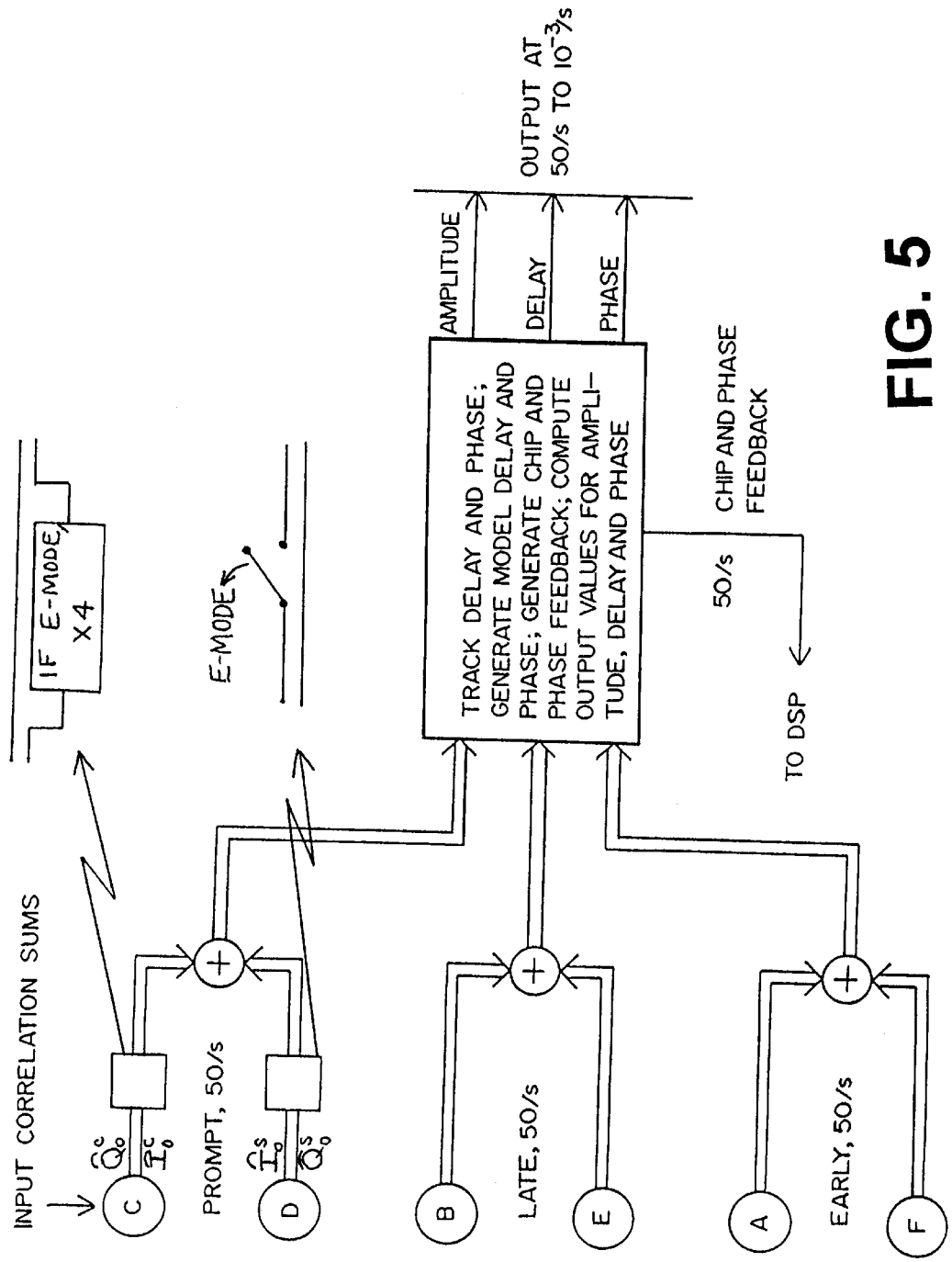
FIG. 5 illustrates the operations in the preferred embodiment of tracking processor that track the delay and phase of the signal, generate model phase and delay, generate feedback for the digital signal processor, and compute output values for amplitude, phase and delay.

In FIG. 3, note that the prompt-I sum from the cosine channel is not transported down and multiplied times the prompt-I sum of the sine channel. This additional multiplication would be redundant in that it would generate exactly the same product (i.e., $I_0^c I_0^s$) as the existing multiplication in the other direction. To save gates (i.e., one less multiply and a smaller 20-ms sum register), this additional multiplication has been omitted. As a result of this omission, later encryption-mode processing at the 50 Hz rate must ignore the sine prompt-I correlation sum and double the cosine prompt-I correlation sum to compensate for the missing sine prompt-I correlation sum. Another doubling of the cosine prompt-I correlation sum is required to further adjust amplitude to account for the factor of two gained by the other correlation sums as a result of adding the two prompt-I sums before cross-processing. FIG. 5 illustrates these special encryption-mode adjustments to the correlation sums.

The output streams from these multiplications (6I, 6Q) are then each successively sum-and-dumped within 20-ms intervals whose edges substantially coincide with the start/stop times of data bits, as controlled by data-bit synch supplied by the L1-C/A channel. The output of these sums are called correlation sums. As shown in FIG. 5, after the compensating operations mentioned above for the prompt-I correlation sum, complex correlation sums corresponding to the same lag are added, thereby yielding one complex correlation sum for each lag. This addition improves the noise on subsequent tracking and estimation of phase and delay by 3 dB. The six resulting correlation sums are processed at a 50/s rate by the tracking processor as outlined below.

Intra-channel cross-processing as described above reduces the effect of the A code. In the preferred embodiment, an I sum is not requantized to ±1 before cross processing as one might be tempted to do in order to mimic a sign, (e.g., see the Lorenz invention). Such requantization would cause about a 2 dB loss in the requantized I-sum SNR for the low I-sum SNRs typically encountered in GPS applications and therefore would degrade output SNR and precision. Furthermore, for high-SNR applications, such requantization will cause nonlinearity in the amplitude of the clipped signal. If signal amplitude is to be accurately measured, that nonlinearity would have to be corrected, which introduces unnecessary complication and uncertainty.

Not shown in FIG. 3 is a second preferred embodiment in the DSP that offers the advantage of fewer 20-ms sums. In that embodiment, early I and late I are differenced before the accumulation step, either by differencing the model codes before multiplication or by differencing the products after multiplication. Since the error signal for the delay-locked loop is ultimately based on the difference in correlation amplitude between early and late lags, tracking of delay can still be carried out. The prompt code is still multiplied times both the I component and the Q component of the counter-rotated signal. Thus, rather than six correlation products, this second embodiment produces only three for each quadrature component: (late-early)-I, prompt-I, and prompt-Q. Subsequent cross-processing with the prompt I sums follows the strategy described above for processing six correlation products. That is, the prompt-I sum from the sine channel is multiplied times the prompt-I sum from the cosine channel. The prompt-I sums from the sine and cosine channels are added and the result multiplied times the two prompt-Q sums and times the two (late-early)-I sums from both sine and cosine channels. The cross-processed sums are accumulated over 20 ms and then, after the compensating operations mentioned above for the prompt-I correlation sums (see FIG. 5), added between quadrature components to yield three output correlation sums for an RF channel: (late-early)-I, prompt-I, and prompt-Q. The resulting prompt-I value is ultimately used for amplitude estimation and for normalizing the other two values. Prompt-Q leads to the tracking error for phase and (late-early)-I leads to the tracking error for delay. The advantage of this embodiment is that only three sums are needed rather than six. The disadvantage is the loss of the information in the neglected sums. For example, when the tracking error in phase is large, the early-Q and late-Q sums are not available for accurate amplitude calculation for the side lags and consequently SNR can be lost in the delay-locked loop (e.g., 3 dB for a 45 degree tracking error).

In the tracking processor, as outlined in FIG. 5, subsequent processing follows the description in U.S. Pat. No. 4,821,294 to Thomas (1989) and will only be summarized here. With input from the L1-C/A channel, the TP analyses the correlation sums to obtain error signals for delay and phase, uses these error signals to track the delay and phase of the signal, projects model phase and model delay, generates chip and phase feedback values to drive the DSP and computes output values for amplitude, delay and phase. When in the encryption mode, the calculation of signal amplitude involve an additional step not described in said Thomas invention. Cross-processing causes the prompt-I correlation sum to be proportional to the square of signal amplitude. To convert to signal amplitude, the prompt-I correlation sum, denoted by $\hat{I}_0$, is transformed according to the formula $A_v \approx K_a \sqrt{N_s \hat{I}_0}$, where $N_s$ is the number of 20.456-MS/s sample points in the sum interval, $A_v$ is the desired signal amplitude, and $K_a \approx 0.31$ is a constant dependent on the A code. When computed in this fashion, signal amplitude measured in the encryption mode will be consistent with signal amplitude measured in the code mode.

Cycle ambiguities are handled in the following ways. The half-cycle ambiguity in L1-C/A phase is removed by testing the overall sign of a synch pattern in the data bits. During acquisition, phase of the L1-P signal is forced to agree with the L1-C/A phase, after accounting for the specified 90 degree offset between the two. In this way, L1-P phase can be measured without a half-cycle ambiguity and with the same full-cycle ambiguity as L1-C/A phase. When L2-P is initially acquired, however, phase is acquired without knowledge of the A-code signs and can therefore have a half-cycle ambiguity. In applications requiring full-cycle rather than half-cycle ambiguities in L2 carrier phase measurements, one can implement additional processing in the form of the relatively simple method shown in FIG. 6. This method is adopted from the well-known method (see U.S. Pat. No. 4,463,357 to MacDoran (1984)) of cross-correlating the L1 and L2 sampled signals to measure phase and delay for L2-P when the P code is encrypted.

Figure 6:
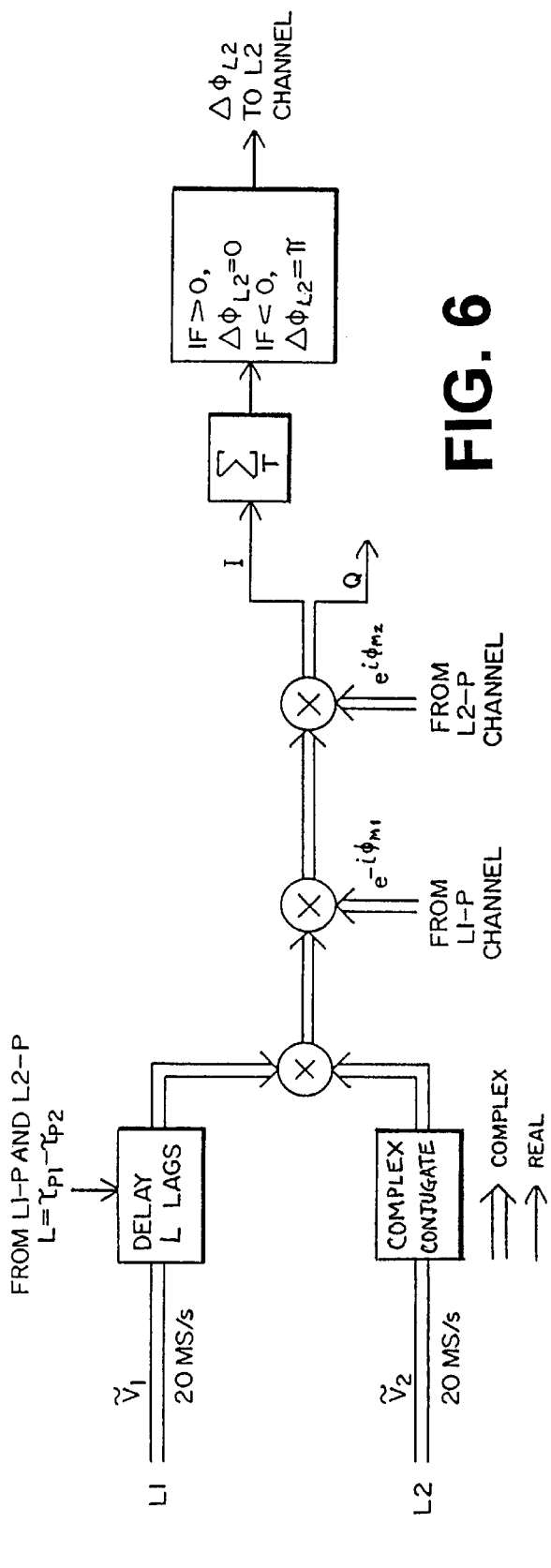
FIG. 6 illustrates the operations used in the preferred embodiment to resolve the half-cycle ambiguity in L2-P phase through cross-correlation of the L1 and L2 signals.

In this adaptation, however, only the prompt lag needs to be processed and only the half-cycle ambiguity in L2 phase is extracted. As a result only a few relatively simple operations are required. As shown in FIG. 6, the complex L1 sampled signal is delayed by a number of lags (typically 0, 1, 2) calculated by rounding to the nearest lag the difference in the L1-P and L2-P delays concurrently measured by the separate L1-P and L2-P channels as described above. This delayed L1 signal is then multiplied in quadrature times the complex L2 sampled signal. The complex product is then subjected to two phase counter-rotations—the first to subtract L1-P phase and the second to add L2-P phase, where both phases are obtained from concurrent operations as described above. The two counter-rotation phasors do not need to be recomputed since they can be tapped directly from the DSP operations for the L1-P and L2-P channels. Since the L1-P and L2-P channels are each locked onto their respective signal, these two counter-rotations place nearly all of the amplitude in the I component. The counter-rotated I component is then accumulated over a some time interval (e.g., 1 sec.) to increase SNR. Since the half-cycle ambiguity in L1-P phase has been eliminated through use of L1-C/A phase, the sign of the accumulated I component determines the half-cycle ambiguity in L2-P phase. If the I component is positive, L2-P phase is not changed; if the I component is negative, the L2-P phase is adjusted by a half cycle.

Figure 7:
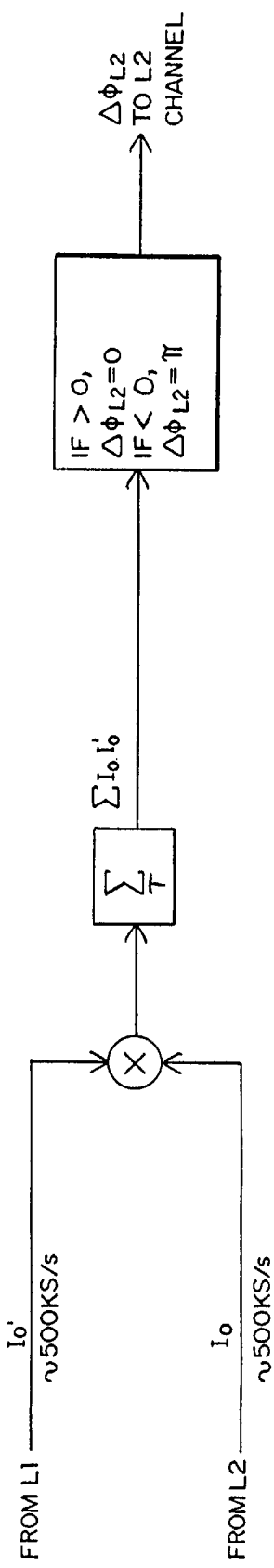
FIG. 7 illustrates the operations used in a second preferred embodiment to resolve the half-cycle ambiguity in L2-P phase through use of an integrated product of the L1-P combined prompt-I sum and the L2-P combined prompt-I sum

As illustrated in FIG. 7, a second preferred embodiment can be used to resolve the half-cycle ambiguity in L2-P phase. For each A-chip accumulation in the processing described above, the prompt I sum from the L1 channel is multiplied times the prompt I sum from the L2 channel and the result is summed over some time interval (e.g., one second). (For each L-band channel, either the prompt I sum obtained from combining the two quadrature-component prompt I sums or the prompt I sum from either quadrature component can be used here. The combined I sum will, of course, provide the best result.) Since the half-cycle ambiguity in L1-P phase has been eliminated through the use of the L1-C/A phase, the sign of this sum of I products can reveal the half-cycle ambiguity in L2-P, if any. If the sum is positive, L2-P phase is not changed; if the sum is negative, the L2-P phase is adjusted by a half cycle.

A comparison of system-noise error in phase between the present invention and the invention disclosed in U.S. Pat. No. 5,134,407 to Lorenz (1992) can be carried out as follows. For the Lorenz invention, let $SNR_1$ be the voltage SNR of prompt-I in the L1 channel after a sum over an A-code chip width and $SNR_2$ the corresponding SNR in the L2 channel. For the Lorenz invention, the voltage SNR after multiplying by the A-code sign estimate is approximately $0.8*SNR_1*SNR_2$ in the typical low SNR case, for either the L1 or the L2 channel. The factor of 0.8 represents the loss caused by requantizing a prompt I sum to make it a +1 or −1. Since L2 is 3 dB weaker than L1 according to GPS specifications, one can assume $SNR_1 \approx \sqrt{2} SNR_2$ so that the voltage SNR for either L1 or L2 becomes $$SNR_{xk} = 0.8 \frac{SNR_1^2}{\sqrt{2}} = 0.566\, SNR_1^2 \quad \text{for } k = 1 \text{ or } 2 \tag{1}$$

where k denotes RF channel Lk and x denotes product. Since noise is the same on all correlation sums in the Lorenz invention, this is the effective SNR for phase and delay for both tracking and estimation.

For the present invention, cross-processing within L1 and within L2 produces the following two respective effective SNRs for L1 and L2 phase:

$$SNR_{x1} = \sqrt{2}\, \sqrt{2}\, \frac{SNR_1}{\sqrt{2}} \frac{SNR_1}{\sqrt{2}} = SNR_1^2 \tag{2}$$

$$SNR_{x2} = \sqrt{2}\, \sqrt{2}\, \frac{SNR_2}{\sqrt{2}} \frac{SNR_2}{\sqrt{2}} = SNR_2^2 \tag{3}$$

which becomes $$SNR_{x2} = 0.5 * SNR_1^2 \tag{4}$$

In Equations (2) and (3), the first multiplicative $\sqrt{2}$ is the improvement from adding the two prompt I sums before cross-processing and the second is the improvement ultimately obtained from adding the cosine and sine quadrature components. (SNR is improved by 3 dB by each of these operations because noise is uncorrelated between quadrature components and between I and Q components). The two dividing $\sqrt{2}$'s, one for each quadrature component, represent the decrease in SNR for a quadrature component relative to the total signal. Comparison of Equation (1) with Equation (2) and Equation (1) with Equation (4) indicates that the effective SNR for phase in the present invention is approximately 5 dB better for L1 and 1 dB worse for L2 relative to the effective SNRs produced by said Lorenz invention.

This comparison suggests that, overall, the present invention generates more precise phase measurements than the Lorenz invention. For example, dual-band-calibrated phase delay is usually the most important phase observable and is generated with the operation $$\tau = \frac{f_1^2}{f_1^2 - f_2^2} \tau_1 - \frac{f_2^2}{f_1^2 - f_2^2} \tau_2 \tag{5}$$

where $f_1$ and $f_2$ are the L1 and L2 frequencies, respectively, and $\tau_1$ and $\tau_2$ are the phase delays derived from L1 and L2 phase, respectively. The L-band frequencies are related by $f_1 = (154/120) f_2$. For purposes of error analysis, Equation (4) can be approximated by $$\tau = 2.54\, \tau_1 - 1.54\, \tau_2 \tag{6}$$

Since noise is uncorrelated between L1 and L2, the 1-$\tau$ error in dual-band-calibrated phase delay is given by $$\sigma_\tau = [2.54^2 \sigma_1^2 + 1.54^2 \sigma_2^2]^{1/2} \tag{7}$$

where $\sigma_1$ and $\sigma_2$ are the 1-$\sigma$ errors in phase delay for L1 and L2, respectively. These 1-$\sigma$ phase-delay errors are given in terms of effective SNR by $$\sigma_k = \frac{\lambda_k}{2\pi SNR_{xk}} \tag{8}$$

where $\lambda_k$ is the wavelength of channel Lk. When Equation (8) is substituted in Equation (7), one obtains $$\sigma_\tau = \left[ 2.54^2 \left( \frac{\lambda_1}{2\pi SNR_{x1}} \right)^2 + 1.54^2 \left( \frac{\lambda_2}{2\pi SNR_{x2}} \right)^2 \right]^{1/2} \tag{9}$$

Substitute Equation (1) in Equation (9) to obtain expression for the phase-delay error for said Lorenz invention and, in parallel, substitute Equations (2) and (4) in Equation (9) to obtain the corresponding expression for the present invention. Taking the ratio of the two resulting expressions yields the following ratio for phase-delay errors for the two inventions:

$$\frac{\text{Lorenz phase} - \text{delay error}}{\text{Present phase} - \text{delay error}} \approx \tag{10}$$

$$\frac{\sqrt{(2.54/0.566)^2 + (154/120)^2 (1.54/0.566)^2}}{\sqrt{2.54^2 + (154/120)^2 (1.54/0.5)^2}}$$

where the ratio 154/120 accounts for the ratio of wavelengths between L1 and L2. This error ratio becomes $$\frac{\text{Lorenz phase} - \text{delay error}}{\text{Present phase} - \text{delay error}} \approx 1.21 \tag{11}$$

Thus, based on the specified ratio of L1 and L2 power, the system-noise error in dual-band-calibrated phase-delay is approximately 20% better for the present invention than for said Lorenz invention. In most high-accuracy applications of GPS receivers, dual-band-calibrated phase delay is the most important phase observable.

A similar analysis can be carried out for the system-noise error in the group delay (pseudorange) observable. As will be demonstrated, the effective SNRs for group delay are still given by Equations (2) and (4), but correlations between the noise on different lags complicates the analysis that leads to those expressions. As described in U.S. Pat. No. 4,821,294 to Thomas (1989), residual group delay is computed for either L1-P or L2-P from the expression $$\delta\tau = k_p \lambda_p L\text{-}E/P \tag{12}$$

where $\lambda_p$ is the P code wavelength (c/10.23 MHz); E, L, and P are the correlation amplitudes for the early, late, and prompt lags, respectively; and $k_p$ is the mapping constant. Since most of the amplitude is typically in the I components, noise propagation can be simplified without compromising validity by considering only the I sums. According to the preferred embodiment of the present invention, the residual delay in Equation (12) is given in terms of I sums by $$\delta\tau = k_p \lambda_p (I_0^c + I_0^s) \frac{(I_+^c - I_-^c + I_+^s - I_-^s)}{4 I_0^c I_0^s} \qquad (13)$$

after the cosine and sine quadrature components have been combined. As explained above, the factor of four in the denominator accounts for the amplitude normalization applied to the cross-processed prompt I sum to make its amplitude consistent with the other sums. Noise on measured delay is determined by propagating the noise on the amplitudes through this expression. When voltage SNR is relatively large (e.g., >10) and tracking error is relatively small, as is typically the case when this formula is used, the noise on $\delta\tau$ comes mainly from numerator, L–E, and not P. (Delay is actually estimated after integration over a relatively long interval (e.g., 1 sec) and therefore involves relatively large SNRs. Thus, for this noise analysis, the denominator will be replaced by its average value and its noise neglected. This approximation causes an insignificant degradation in accuracy. If the full error analysis is carried out with long integration, one can show that the average would show up in the denominator and the noise in the numerator would accumulate and average down, as usual, as the square root of integration time). Given the low SNRs leaving an A-chip sum, noise on the delay in Equation (13) is given to good approximation by $$N_\tau \approx k_p \lambda_p \frac{(\eta_0^c + \eta_0^s)(\eta_+^c - \eta_-^c + \eta_+^s - \eta_-^s)}{4 I_0^c I_0^s} \qquad (14)$$

where $\eta$ is the noise, as labeled, on each respective A-chip sum and the overbars denote averages. The statistical average of $N_\tau$ is given by $$\langle N_\tau \rangle \approx \frac{k_p \lambda_p}{4 I_0^c I_0^s} [\langle \eta_0^c \eta_+^c \rangle + \langle \eta_0^s \eta_+^c \rangle - \langle \eta_0^c \eta_-^c \rangle - \langle \eta_0^s \eta_-^c \rangle + \qquad (15)$$

$$\langle \eta_0^c \eta_+^s \rangle + \langle \eta_0^s \eta_+^s \rangle - \langle \eta_0^c \eta_-^s \rangle - \langle \eta_0^s \eta_-^s \rangle]$$

These averages of noise products have the following values. The average of the square of any $\eta$ will be denoted by $\sigma^2$. Noise is uncorrelated between the cosine and sine components. For a given quadrature component, the prompt noise has a correlation of $\rho = 10.23/20.456 \approx 0.5$ with the noise on either side lag and the side lags are uncorrelated with one another. These averages are mathematically summarized as $$\langle \eta_i^c \eta_i^c \rangle = \langle \eta_i^s \eta_i^s \rangle = \sigma^2 \qquad (16)$$

$$\langle \eta_i^c \eta_j^s \rangle = 0 \qquad (17)$$

where i or j equals –1, 0, or +1;

$$\langle \eta_+^c \eta_-^c \rangle = \langle \eta_+^s \eta_-^s \rangle = 0 \qquad (18)$$

and $$\langle \eta_0^c \eta_+^c \rangle = \langle \eta_0^c \eta_-^c \rangle = \langle \eta_0^s \eta_+^s \rangle = \langle \eta_0^s \eta_-^s \rangle = \rho \sigma^2 \qquad (19)$$

where $\rho$ is the correlation between the noise on the prompt lag and the noise on either side lag.

Substitution of these expressions in Equation (15) yields $$\langle N_\tau \rangle \approx \frac{k_p \lambda_p}{4 I_0^c I_0^s} [\rho\sigma^2 - \rho\sigma^2 + \rho\sigma^2 - \rho\sigma^2] = 0 \qquad (20)$$

This theoretical analysis indicates that, even though multiplying by the sum of the two prompt I sums introduces a noise bias, on average, in the amplitude for each side lag, the bias is the same for the early and late lags and cancels out in the L–E difference. (Based on the above formalism, one can easily show that the bias due to the late-lag amplitude or early-lag amplitude in Equation (14) is 2 $\rho\sigma^2$). Thus, if the receiver is implemented to provide exact cancellation as theoretically shown, the L–E difference becomes an unbiased measure of the tracking error for group delay in spite of the apparent problem of biased amplitudes.

The variance of the noise on delay is $$\sigma_\tau^2 \approx \langle N_\tau^2 \rangle \qquad (21)$$

which, based on Equation (14), becomes $$\sigma_\tau^2 \approx \frac{k_p \lambda_p \langle [(\eta_0^c + \eta_0^s)(\eta_+^c - \eta_-^c + \eta_+^s - \eta_-^s)]^2 \rangle}{[4 I_0^c I_0^s]^2} \qquad (22)$$

When the square is expanded into all of its terms, one obtains a sum of 30 averages, each of which is a product of four noise terms. If each noise term is a Gaussian random variable, as is very nearly the case here, each of the 30 averages can be computed according to the expression $$\langle \eta_1 \eta_2 \eta_3 \eta_4 \rangle = \langle \eta_1 \eta_2 \rangle \langle \eta_3 \eta_4 \rangle + \langle \eta_1 \eta_3 \rangle \langle \eta_2 \eta_4 \rangle + \langle \eta_1 \eta_4 \rangle \langle \eta_2 \eta_3 \rangle \qquad (23)$$

The first of the 30 averages emerging from Equation (22), for example, can be evaluated as $$\langle \eta_0^c \eta_0^c \eta_+^c \eta_+^c \rangle = \langle \eta_0^c \eta_0^c \rangle \langle \eta_+^c \eta_+^c \rangle + 2 \langle \eta_0^c \eta_+^c \rangle \langle \eta_0^c \eta_+^c \rangle \qquad (24)$$

Based on Equations (16) and (19), this average becomes $$\langle \eta_0^c \eta_0^c \eta_+^c \eta_+^c \rangle = \sigma^4 (1 + 2\rho^2) \qquad (25)$$

When each of the 30 averages in Equation (22) has been evaluated in a similar manner, the 1-$\sigma$ delay error becomes $$\sigma_\tau \approx \frac{k_p \lambda_p}{\sqrt{2}} \frac{\sigma^2}{I_0^c I_0^s} \qquad (26)$$

The form for delay error in terms of SNR in the code mode is $$\sigma_\tau = \frac{\sqrt{2} k_p \lambda_p}{SNR_{xk}} \qquad (27)$$

in which $\sqrt{2}$ accounts for the increase in noise caused by differencing the early and late amplitudes. Comparison of Equations (26) and (27) shows that effective SNR in the encryption mode is given by $$SNR_{xk} \approx 2 \frac{I_0^c I_0^s}{\sigma \sigma} \qquad (28)$$

The ratio, $I_0^c I_0^s / \sigma^2$, is the SNR of the cross-processed prompt-I sum and is equal to the product of the I sum SNR for the cosine quadrature channel and the I sum SNR for the sine quadrature channel, each at the output of the A-chip sum. Since each quadrature component has an SNR that is 3 dB lower than the total signal, we know $$\frac{I_0^c}{\sigma}\frac{I_0^s}{\sigma} = \frac{SNR_k^2}{2} \quad (29)$$

where $SNR_k$ is the SNR per A-chip sum for the total signal for RF channel k, before cross-processing, as defined above. Thus, by substituting Equation (29) in Equation (28), one finds the effective SNR for RF channel k is given by $$SNR_{xk} \approx SNR_k^2 \quad (30)$$

which is in agreement with Equations (2) and (3). Thus, despite the large noise bias on early and late amplitudes, the effective SNRs for group delay are the same as the effective SNRs for phase delay.

To see how much has been gained by combining cosine and sine quadrature components and by adding the two prompt-I sums before cross-processing, one can carry out the same analysis without those steps. In that simpler implementation, delay noise for the sine quadrature component, for example, is given by $$N_\tau \approx \frac{k_p \lambda_p \eta_0^c (\eta_+^s - \eta_-^s)}{I_0^c I_0^c} \quad (31)$$

Note that the factor of four in the denominator of Equation (14) is omitted since it is no longer needed in this implementation to compensate for the two omitted steps just mentioned. Following the analysis above, the 1-σ delay error becomes $$\sigma_\tau \approx \sqrt{2} k_p \lambda_p \frac{\sigma^2}{I_0^c I_0^s} \quad (32)$$

Comparison of Equations (26) and (32) indicates that a factor-of-two (6 dB) improvement in delay noise is gained. Thus, the same two √2's in effective voltage SNR are gained in delay processing as were described above for phase processing (see Equations (2) and (3)). This analysis demonstrates that the two steps, combining the cosine and sine quadrature components and adding the prompt-I sums before cross-processing, each provide a 3-dB improvement in delay noise, for both tracking and estimation, for both L1-P and L2-P.

It is a peculiarity of this method that the SNR for the prompt-I sum correlation is lower than the effective SNR for group delay and phase delay by 6 dB. (In the code mode, noise is the same for all six correlation sums, 3I and 3Q, and therefore prompt-I SNR and effective SNR for phase and delay are all the same). Lower SNR for the prompt-I correlation sum is of negligible consequence when that sum is used for amplitude normalization and is applied after a relatively long integration (even longer than the phase or delay update interval if necessary). The long integration raises the SNR of the prompt-I correlation sum to more acceptable levels and, as mentioned above, when noise is propagated through the phase and delay extraction equations, the effect of prompt-I noise is greatly reduced if the tracking error is small, as is usually the case. As discussed above, when in the encryption mode, signal amplitude is extracted from the prompt-I correlation sum by means of a square-root operation. This square-root operation increases the SNR for the resulting signal amplitude by 6 dB relative to that of the prompt-I correlation sum itself. Thus, for a given RF channel, the output value for signal amplitude ends up having the same effective SNR as delay and phase for that RF channel.

A comparison of the system-noise error in dual-band-calibrated group delays, as measured by the present invention and by the Lorenz invention, parallels the analysis presented above for phase delay. As indicated above, the effective voltage SNRs in Equations (2) and (4) also apply to group delay. Since P1 and P2 group delays are based on the same wavelength, however, the final ratio, which is given by Equation (10) for phase delay, does not have the 120/154 factor:

$$\frac{\text{Lorenz group} - \text{delay error}}{\text{Present group} - \text{delay error}} \approx \frac{\sqrt{(2.54/0.566)^2 + (1.54/0.566)^2}}{\sqrt{2.54^2 + (1.54/0.5)^2}} \quad (33)$$

This ratio becomes $$\frac{\text{Lorenz group} - \text{delay error}}{\text{Present group} - \text{delay error}} \approx 1.31 \quad (34)$$

Thus, the present invention provides measurements of dual-band-calibrated group delay with system-noise errors that are approximately 30% better than those provided by the Lorenz invention.

Variations in Embodiment

The essential features of the present invention can be realized through numerous other embodiments, dissimilar in appearance but equivalent in novelty and advantage to the preferred embodiment. Examples of some equivalent embodiments include but are not limited to various combinations of the following. The conversion of an RF signal (i.e., L1 or L2) to two quadrature components can be accomplished in a number of ways and does not have to consist of analog down-conversion from RF to baseband followed by sampling. For example, quadrature components can be generated by sampling at RF or IF. The number of amplitude quantization levels for each sample can be two or greater, with SNR loss decreasing as the number of levels increases. Numerous variations of code correlation and carrier counter-rotation are viable alternatives. For example, code correlation can proceed carrier counter-rotation. More lags than three can be applied and the lag spacing can be larger or smaller than that in the preferred embodiment. Correlation sums can be generated for different combinations of I, Q and lag and still lead to a viable receiver. Examples are the options: (a) early-I, prompt-I, late-I, and prompt-Q and (b) early-I, late-I and prompt-Q. These variations require less processing than the six-sum option but provide less information. Feedback from the tracking processor to the DSP can consist of chip rate and phase rate; chip rate, phase and phase rate; or chip, chip rate, phase and phase rate.

The various processing steps from RF to output delay and phase can be carried out in different order in a wide variety of ways and said steps can be implemented with either analog or digital components. For example, complex digital phase-locked counter-rotation can be replaced by complex analog phase-locked down-conversion.

The two synchronized accumulation steps in the DSP, over A-chips (about 2 μs) and data bits (about 20 ms), can be changed from straight sums to more complicated digital filters in order to change the filtering characteristics of those steps. The durations of both of these sums can be changed to numerous other values. For example, the 20-ms update interval can be changed to 1-ms, and can be different for phase feedback and delay feedback. The A-code accumulation does not necessarily have to be closely synchronized with its respective code to obtain useful performance in some applications. For example, even a sum with a length close to but highly incommensurate with the A-chip width would improve the L2-P phase error by about 10 dB relative to straight cross-correlation of L1 and L2 rather than about 13 dB. Such lack of synchronization sacrifices SNR but loosens constraints.

Cross-processing with respect to the early-I, late-I and/or Q sums can be carried by cross-multiplying with opposite-component prompt-I sum, without first adding the two prompt I sums. Complexity of processing is slightly decreased but phase and delay noise are increased by 3 dB by omitting this step. The combining of the prompt I sums for use in cross-processing could be a straight average instead of a sum, which changes amplitude normalization. Instead of using just the prompt I sums for cross processing, other combinations of I sums can be used, including but not limited to various weighted combinations of the I sums, including the early and late sums. For large phase tracking errors, instead of combining only I sums, both I and Q sums can be combined to obtain the quantity to be used in cross-processing. For example, the combination I cos φ+Q sin φ could be used where φ is an estimate of tracking error. The sum of prompt-I sums could be used to cross process prompt-I sums, instead of just the opposite prompt-I sum. These options include $(I_0^s+I_0^c)I_0^c$ and $(I_0^s+I_0^c)\times(I_0^s+I_0^c)$. As mentioned above, these options lead to a bias in the cross-processed prompt-I sums that complicates the amplitude measurement. At the cost of an extra multiply and a larger 20-ms sum register, the mirror-image operation could be applied to the prompt-I sum for the sine channel. As mentioned above, this additional multiplication results in exactly the same value for the cross-processed prompt-I sum for the sine channel as for the cosine channel (i.e., $I_0^c \, I_0^s$). The advantage of this additional multiplication is symmetry in correlated sums between the cosine channel and the sine channel when in the encryption mode. In the code mode, symmetry prevails since there is no cross-multiplication. (If the prompt-I sums are requantized to fewer levels before cross-multiplying, this additional cross-multiplication becomes more attractive since fewer gates would be needed to implement it. With requantization to ±1 or to 0, ±1, the gate increase is minor.)

Before cross-processing, the I sums, whether single I sums or a combination of I sums, can be subjected to an additional step of requantization to fewer levels (e.g., to ±1 to 0, ±1 or more levels, with SNR loss decreasing as level count increases). Such requantization would have the disadvantage of decreasing SNR in typical applications but would have the advantage of decreasing the number of bits required to represent subsequent products.

After cross-processing, correlations sums corresponding to the same lag could be added before carrying out the sum over 20 ms, which would yield six correlation sums for each RF channel. This attractive option would decrease the number of 20-ms sum registers by a factor of two, but would require the additional pre-adders operating at about 500,000 operations/sec and would increase the size of the 20-ms sum registers by a bit. In the preferred embodiment, the combining of 20-ms correlation sums corresponding to the same lag could have been carried out in either the tracking processor or the DSP since it is a slow operation.

When half-cycle ambiguities in L2-P phase are allowed, the L2-P channel can be deleted and very useful dual-band measurements can still be provided by the L1-C/A and L2-P channels. This option results in a substantial decrease (33%) in processing steps and power consumption in the DSP.

Numerous variations are possible in the tracking processor, including but not limited to a multitude of choices for method for correlation processing, extraction of delay and phase tracking errors, phase-locked loops, delay-locked loops, loop aiding, projecting model phase and delay, phase and chip feedback, integration times, extraction of amplitude, delay and phase measurements, integration and smoothing algorithms, and data-bit synch.

L1-C/A aiding of L1-P and L2-P can be eliminated. More specifically, if band-specific fading is present, the L2-P channel can be set to track independently of the L1 channel (i.e., no L1-C/A aiding) so that fading of L1 will not stop the L2 track.

Although particular embodiments have been disclosed herein, it will readily occur to those skilled in the art that the novelty and advantages unique to the present invention can be realized through numerous other equivalent embodiments, not limited to those disclosed herein. Accordingly, all such equivalent embodiments are deemed to be within the scope of this invention, which is to be limited only by the claims appended hereto.

We claim:

1. A receiver for processing a received signal transmitted as an L1 or an L2 signal comprised of a single carrier modulated by a known code and by an unknown code wherein said unknown code causes adverse effects, said receiver comprising:

means for converting said L1 or L2 signal to quadrature components;

means for generating a model for said carrier;

means for generating a model for said known code;

means for counter-rotating said quadrature components of said L1 or L2 signal with said model carrier to produce counter-rotated signals;

means for correlating said model code with said counter-rotated signals to produce at least one correlation product separately for each counter-rotated signal;

means for accumulating said correlation products successively over selected time intervals;

means for combining with one another said accumulated correlation products derived from said quadrature components of said L1 or L2 signal in a manner reducing said adverse effects of said unknown code; and, means for generating an amplitude factor whereby said combined accumulated correlation products and amplitude factor are used to extract said signal's amplitude, phase, and delay, in the presence of said unknown code.

2. The receiver recited in claim 1 wherein said measured signal phase is susceptible to phase ambiguity, and wherein the signal additionally contains a second signal, denoted as the L1-C/A signal, the receiver further comprising:

means for measuring the phase of said L1-C/A signal and means responsive to said L1-C/A phase for avoiding said ambiguity in said measured phase.

3. The receiver recited in claim 1 wherein said unknown code consists of a sequence of chips and the correlation-product-accumulating means includes means for accumulating said correlation products separately for each quadrature component successively over time intervals substantially equal in length to chip widths of the unknown code.

4. The receiver recited in claim 3 wherein said time intervals of the correlation-product-accumulating means are substantially coincident with the chips of the unknown code.

5. The receiver recited in claim 1 wherein the correlating means generates for each of the two quadrature components at least four correlation products, denoted as early-I correlation product, prompt-I correlation product, late-I correlation product, and prompt-Q correlation product and wherein the accumulating means generates at least four accumulated correlation products, denoted as accumulated early-I correlation product, accumulated prompt-I correlation product, accumulated late-I correlation product, and accumulated prompt-Q correlation product.

6. The receiver recited in claim 5 wherein the accumulated-correlation-product combining means includes means for generating at least one weighted combination of said at least six accumulated I correlation products from the two said quadrature components and means for combining said at least one combined accumulated I correlation product with at least one of the said at least three accumulated I correlation products from at least one quadrature component.

7. The receiver recited in claim 5 wherein the accumulated-correlation-product-combining means includes means for adding said accumulated prompt-I correlation product from a first said quadrature component to said accumulated prompt-I correlation product from a second said quadrature component and for combining said sum of accumulated prompt-I correlation products with the early-I correlation product and with the late-I correlation product from at least one quadrature component.

8. The receiver recited in claim 5 wherein said accumulated-correlation-product-combining means includes means for generating at least one weighted combination of the said at least six accumulated I correlation products from the two said quadrature components and means for combining said at least one combined accumulated I correlation product with said at least one accumulated Q correlation product from at least one of said quadrature components.

9. The receiver recited in claim 5 wherein said accumulated-correlation-product-combining means includes means for adding the said accumulated prompt I correlation products from the two said quadrature components and means for combining said sum of accumulated prompt I correlation products with at least one said accumulated Q correlation product from at least one of said quadrature components.

10. The receiver recited in claim 5 wherein said accumulated-correlation-product-combining means comprises means for multiplying said accumulated prompt I correlation product from a first said quadrature component times at least one accumulated Q correlation product from a second said quadrature component and means for multiplying said accumulated prompt I correlation product from said second quadrature component times at least one accumulated Q correlation product from said first quadrature component.

11. The receiver recited in claim 5 wherein said accumulated-correlation-product-combining means comprises means for multiplying said accumulated prompt I correlation product from a first said quadrature component times said accumulated early-I correlation product, accumulated prompt-I correlation product and accumulated late-I correlation product from a second said quadrature component and means for multiplying said accumulated prompt I correlation product from said second quadrature component times said accumulated early-I correlation product, accumulated prompt-I correlation product and accumulated late-I correlation product from said first quadrature component.

12. The receiver recited in claim 5 wherein the amplitude factor generating means includes means for multiplying by a factor of four the product of the accumulated prompt-I correlation product from one of said quadrature components times the accumulated prompt-I correlation product from the other of said quadrature components.

13. The receiver recited in claim 1 wherein the correlating means generates for each of the two quadrature components at least three correlation products, denoted as (late-minus-early)-I correlation product, prompt-I correlation product, and prompt-Q correlation product and wherein the accumulating means generates at least three accumulated correlation products, denoted as accumulated (late-minus-early)-I correlation product, accumulated prompt-I correlation product, and accumulated prompt-Q correlation product.

14. The receiver recited in claim 13 wherein said accumulated-correlation-product combining means includes means for adding the said accumulated prompt-I correlation products from the two said quadrature components and means for combining said sum of accumulated prompt-I correlation products with at least one said accumulated Q correlation product from at least one of said quadrature components.

15. The receiver recited in claim 13 wherein the accumulated-correlation-product-combining means includes means for adding said accumulated prompt-I correlation product from a first said quadrature component to said accumulated prompt-I correlation product from a second said quadrature component and for combining said sum of accumulated prompt-I correlation products with the (late-minus-early)-I correlation product from at least one of said quadrature component.

16. The receiver recited in claim 13 wherein the accumulated-correlation-product-combining means comprises means for multiplying said accumulated prompt I correlation product from a first said quadrature component times at least one said accumulated Q correlation product from a second said quadrature component and means for multiplying said accumulated prompt I correlation product from second said quadrature component times at least one said accumulated Q correlation product from first said quadrature component.

17. The receiver recited in claim 13 wherein the accumulated-correlation-product-combining means comprises means for multiplying said accumulated prompt-I correlation product from a first said quadrature component times said accumulated (late-minus-early)-I correlation product and said accumulated prompt-I correlation product from a second said quadrature component and means for multiplying said accumulated prompt-I correlation product from said second quadrature component times said accumulated (late-minus-early)-I correlation product and said accumulated prompt-I correlation product from said first quadrature component.

18. The receiver recited in claim 1 wherein the signal additionally contains a second signal, denoted as the L1-C/A signal, the receiver further comprising:
   means for tracking said L1-C/A signal; and
   means responsive to said L1-C/A tracking for supplying input to said means for generating said model of said carrier or said known code or said amplitude factor.

19. A receiver for processing a received L1 signal and a received L2 signal, each having a single respective carrier modulated by a respective known code and by respective unknown codes wherein said unknown code causes adverse effects, said receiver comprising:

means for converting each said L1 and L2 signal to respective quadrature components;

means for generating a respective model for each said carrier;

means for generating a respective model for each said known code;

means for counter-rotating said respective quadrature components of said L1 and L2 signal with said respective model carrier to produce respective counter-rotated signals;

means for correlating said respective model code with said respective counter-rotated signals to produce at least one respective correlation product separately for each said respective counter-rotated signal;

means for accumulating said respective correlation products successively over selected respective time intervals;

means for combining with one another separately for the L1 and L2 signals said respective accumulated correlation products derived from said quadrature components of said L1 and L2 signals in a manner reducing said adverse effects of said unknown code; and, means for generating an amplitude factor whereby said respective combined accumulated correlation products and amplitude factor are used to extract said signal's amplitude, phase, and delay, in the presence of said unknown codes.

20. The receiver recited in claim 19 wherein one of the measured phases is susceptible to phase ambiguity, the receiver further comprising:

means for cross-correlating said two signals to generate cross-correlation products; and means responsive to said cross-correlation products for avoiding said phase ambiguity.

21. The receiver recited in claim 19 wherein said measured L1-P phase is susceptible to phase ambiguity, and wherein the L1 signal additionally contains a second signal, denoted as the L1-C/A signal, the receiver further comprising:

means for measuring the phase of said L1-C/A signal; and means responsive to said L1-C/A phase for avoiding said phase ambiguity in said measured L1-P phase.

22. The receiver recited in claim 21 wherein said L2-P measured phase is susceptible to phase ambiguity, the receiver further comprising:

means responsive to said combined accumulated correlation products for avoiding said phase ambiguity.

23. A method for processing a received signal transmitted as an L1 or an L2 signal comprised of a single carrier modulated by a known code and by an unknown code wherein said unknown code causes adverse effects, said method comprising the following steps:

converting said L1 or L2 signal to quadrature components;

generating a model for said carrier;

generating a model for said known code;

counter-rotating said quadrature components of said L1 or L2 signal with said model carrier to produce counter-rotated signals;

correlating said model code with said counter-rotated signals to produce at least one correlation product separately for each counter-rotated signal;

accumulating said correlation products successively over selected time intervals;

combining with one another said accumulated correlation products derived from said quadrature components of said L1 or L2 signal in a manner reducing said adverse effects of said unknown code; and, generating an amplitude factor whereby said combined accumulated correlation products and amplitude factor are used to extract said signal's amplitude, phase, and delay, in the presence of said unknown code.

* * * * *